Patented Oct. 7, 1952

2,613,221

UNITED STATES PATENT OFFICE 2,613,221

PREPARING POLYHALOGENOALKENYL COMPOUNDS

Elbert C. Ladd and Merlin P. Harvey, Passaic, N. J., assignors to United States Rubber Company, New York, N. Y., a corporation of New Jersey No Drawing. Application April 30, 1948, Serial No. 24,444

7 Claims. (Cl. 260—493)

The invention relates to a novel method for synthesizing compounds of the type formula $X_2C=CR-CR'R''-A$ wherein each $X$ is chlorine; $R$, $R'$ and $R''$ are radicals selected from the class of hydrogen, hydrocarbon and substituted hydrocarbon groups; and $A$ is a radical derived from a compound HA containing at least one "acidic" hydrogen, i. e., a hydrogen replaceable by sodium, and more specifically as defined below.

We have discovered that compounds of the type formula $X_3C-CHR-CR'R''-Y$, which contain a trihalogenomethyl group and another halogen atom linked through an aliphatic chain of two carbon atoms, will react directly with alkaline compounds of the type MA where M is a cation-forming atom or group from the class of hydrogen, alkali metals, alkaline-earth metals and the ammonium ion to effect concurrent replacement of the halogen atom $Y$, and dehydrohalogenation of the $-CX_3$ group, whereby the compounds $X_2C=CR-CR'R''-A$ are formed in a simple one-step process:

(1) $X_3C-CHR-CR'R''-Y+MA\rightarrow$
$X_2C=CR-CR'R''-A+MY+HX$

We have found that this reaction gives the 3,3-dihalogeno-2-propenyl compounds $X_2C=CR-CR'R''-A$ in satisfactory yields, little or no by-products of the types $X_3C-CHR-CR'R''-A$ and $XC\equiv C-CR'R''-A$ being formed although occasionally some of the type $X_3C-CR=CR'R''$ may be encountered.

In the above formula $X$ is chlorine or bromine, and $Y$ is $X$ and chlorine only when each $X$ is chlorine; the starting chemicals can be made by the free-radical-catalyzed reaction of an olefinic compound $RHC=CR'R''$ with a tetrahalogenomethane $CX_3Y$, as illustrated by:

(2)

$CX_3Y + RCH=CR'R'' \xrightarrow{\text{free-radicals}} X_3C-CHR-CR'R''-Y$

We have further discovered that this novel reaction of compounds of the type formula $X_3C-CHR-CR'R''-Y$ is in marked contrast to that of compounds in which the trihalogenomethyl and the halogen atom $Y$ are linked through an aliphatic chain of more than two carbon atoms. For example, 1,1,1,5-tetrachloropentane reacts with potassium acetate to form 5,5,5-trichloropentyl acetate:

(3) $Cl_3C-CH_2-CH_2-CH_2-CH_2-Cl+$
$K-OCO-CH_3\rightarrow$
$Cl_3C-CH_2-CH_2-CH_2-CH_2-OCO-CH_3$ whereas we have found that the 1,1,1,3-tetrachloropropane of our invention reacts with potassium acetate in a different sense to yield 3,3-dichloro-2-propenyl acetate:

(4) $Cl_3C-CH_2-CH_2-Cl+K-OCO-CH_3\rightarrow$
$Cl_2C=CH-CH_2-OCO-CH_3$

Similarly 1,1,1,5 - tetrachloropentane reacts with ammonia to yield 5,5,5-trichloropentyl amine:

(5) $Cl_3C-CH_2-CH_2-CH_2-CH_2-Cl+NH_3\rightarrow$
$Cl_3C-CH_2-CH_2-CH_2-CH_2-NH_2$ whereas we have found that 1,1,1,3-tetrachloropropane reacts with ammonia in a different sense to form 3,3-dichloro-2-propenyl amine:

(6) $Cl_3C-CH_2-CH_2-Cl+NH_3\rightarrow$
$Cl_2C=CH-CH_2-NH_2$

In reactions (4) and (6) above, the method of our invention is illustrated by replacement of the terminal halogen atom, $Y$, with the acetoxy group and the $NH_2$ group, respectively. More generally, $Y$ can be replaced by the group $A$ which can be acidyloxy (e. g., acetoxy, chloracetoxy, glycoloxy, phenacetoxy, propionyloxy, acryloxy, methacryloxy, chloroacryloxy, butyryloxy, valeryloxy, caproyloxy, lauroyloxy, benzoyloxy, succinyloxy, maleyloxy, fumaryloxy, adipyloxy, phthalyloxy, methylsulfato, benzenesulfonato, diethylborato, ethylcarbonato, diethylphosphato, and trimethylsilicato), alkoxy (e. g., methoxy, propoxy, isopropoxy, butoxy, isobutoxy, sec.-butoxy, amyloxy, cyclopentoxy, hexoxy, cyclohexoxy, heptoxy, octoxy, nonoxy, decoxy, undecoxy and dodecoxy), an alkenylalkoxy group (e. g., allyloxy, methallyloxy, crotyloxy, chloroallyloxy, 4-pentenoxy and geranyloxy, including 3,3-dihalogeno-2-propenoxy of the type formula $X_2C=CR-CR'R''-O-$ wherein $R$, $R'$ and $R''$ are as hereinafter defined), aryloxy (e. g., phenoxy, tolyloxy, p-chlorophenoxy, p-methoxy-phenoxy and naphthoxy), aralkoxy (e. g., benzyloxy and beta-phenylethoxy). The terminal halogen atom $Y$ can also be replaced by thioether and organic thioacid ester groups corresponding to the oxygen analogs listed above, as well as groups from the class of disulfide, xanthogeno (e. g., alkylxanthogeno), thiocyano and dithiocarbamyl. Moreover, the halogen atom $Y$ can also be replaced by other halogens from the class of fluorine, chlorine, bromine and iodine, as well as by nitro, imido, amino, hydrazino, mono- and di-substituted amino (e. g., N-alkylamino, N-alkenylamino, N-arylamino, N-aralkylamino, N-dialkylamino, N-diarylamino, N-aryl-N-alkylamino, cycloalkylamino and cycloalkenamino from which the corresponding quaternary ammonium compounds can be readily prepared. Finally the halogen atom $Y$ can be replaced by carbonitrilo, and groups derived from compounds containing an acidic hydrogen, i. e., a hydrogen atom replaceable by sodium, such compounds including fluorene, acetylenic hydrocarbons of the type formula $HC{\equiv}C{-}R°$ where $R°$ is hydrogen, alkyl (e. g., methyl, ethyl, propyl and butyl) or aryl (e. g., phenyl), and carbonyl compounds of the type formula $R^*{-}CHR^+{-}CO{-}R^{**}$ where $R^*$ is acyl (e. g., acetyl), carbalkoxy (e. g., carbomethoxy) or carbonitrilo, $R^+$ is hydrogen, alkyl (e. g., methyl, ethyl, propyl, isopropyl and butyl) or $X_2C{=}CR{-}CR'R''{-}$ as hereinafter defined and $R^{**}$ is alkoxy (e. g., methoxy, ethoxy), alkyl or aryl.

As indicated in reaction (4) the substituents R, R' and R'' can be hydrogen. However, R may likewise be lower alkyl (e. g., methyl and ethyl), phenyl, carboxyl and carboxymethyl as well as derivatives hydrolyzable thereto (e. g., carbalkoxy such as carbomethoxy, carbaryloxy such as carbophenoxy, carbaralkoxy such as carbobenzyloxy, carboxymethyl, carbonitrilo, carbinitrilomethyl, carbamyl and carbanhydro), and acyloxymethyl (e. g., acetoxymethyl, butyroxymethyl and benzoyloxymethyl) while R' and R'' may likewise be alkyl (e. g., methyl, ethyl, propyl, isopropyl, butyl, amyl, cyclopentyl, hexyl, cyclohexyl, heptyl, octyl, nonyl and decyl), alkenylalkyl (e. g., 3-butenyl and 4-cyclohexenyl), aryl (e. g., phenyl, tolyl, xylyl, naphthyl, xenyl, p-chlorophenyl, o,p-dichlorophenyl, p-fluorophenyl and p-methoxyphenyl), aralkyl (e. g., benzyl), acid groups and acid-alkyl groups, as well as the corresponding derivatives hydrolyzable thereto, (e. g., carboxyl, carbonitrilo, carbalkoxy, carbaryloxy, diethoxyphosphenyl, ethoxysulfonyl, trimethoxysilicyl, carboxymethyl, carboxyethyl, carboxynonyl, carbonitrilomethyl and diethoxyphosphonyl), acidoxy and acidoxyalkyl (e. g., acetoxy, propionoxy, butyroxy, benzoyloxy, diethylphosphato, ethysulfato, acetoxymethyl, acetoxyethyl and acetoxynonyl), acidyl and acidylalkyl (e. g., acetyl, acetylmethyl and ethylsulfonyl), R'' may additionally be an ether group from the class of alkoxy, aryloxy and aralkoxy including the corresponding alkoxyalkyl, aryloxyalkyl and aralkoxyalkyl groups as well as the corresponding thioether groups (e. g., methoxy, ethoxy, 2-hydroxyethoxy, ethylthio, methoxymethyl, phenoxy, p-chlorophenoxy, phenylthio, phenoxymethyl and benzyloxy), and a heterocyclic group containing a ring of five or six atoms including one hetero-atom of the class of oxygen, nitrogen and sulfur (e. g., furyl, dihydrofuryl, tetrahydrofuryl, thienyl, pyrryl, tetrahydropyrryl and pyridyl; also R and R'' may together constitute an aliphatic chain of 3 or 4 carbon atoms (e. g., tetramethylene). In the above first mentioned type formula, at least one of R, R' and R'' is preferably hydrogen, and R is hydrogen when R' and R'' are hydrogen.

Especially preferred aspects of our invention are the following reactions:

(A)
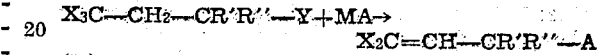

(B)
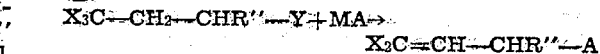

(C)
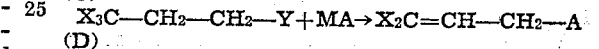

(D)
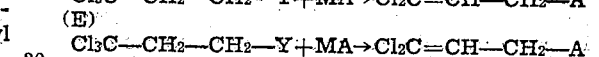

(E)
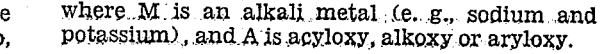

where M is an alkali metal (e. g., sodium and potassium), and A is acyloxy, alkoxy or aryloxy.

(F)
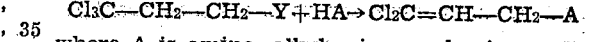

where A is amino, alkylamino, arylamino or N-aryl-N-alkyl-amino.

(G)
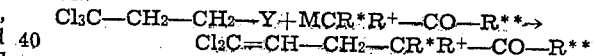

where M is an alkali metal.

Specific illustrations of the reactions of our invention are given below in the table.

*Table*

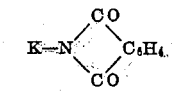

The reaction of our invention is carried out by heating, e. g., at 25–200° C., the starting material, $X_3C$—CHR—CR'R''—Y with at least one and preferably from one to four molar equivalents of the alkaline reactant MA for times in the range of 0.1 to 48 hours. The reaction conditions will vary somewhat depending upon the reactants employed. Thus for example when MA is an alkali metal alcoholate, e. g., potassium ethylate, the reactions are often so markedly exothermic as to require cooling; optionally, in addition, a diluent such as the ethanol can be used to maintain control of this reaction. For such purposes the metal alcoholate can be replaced by a mixture of from 1 to 20 molar equivalents of the alcohol and from 2.0 to 5, and preferably 2.3 to 4, molar equivalents of the alkali metal hydroxide, although this latter method is not preferred since it yields a considerable amount of other by-products. In contrast, where MA is an alkali metal cyanide or thiocyanate the reactions thereof, according to our invention, are slower and elevated reaction temperatures, e. g., 150–200° C. are most conducive to the formation of the desired product in high yields. Superatmospheric pressures can be employed with the more volatile reactants in order to attain the desired reaction temperatures. The reaction products are isolated by filtration, preferential extraction, fractional distillation and/or crystallization.

The following examples disclose our invention in more detail. All parts are by weight.

Example 1

To 51.7 parts of 1,1,1,3-tetrachloropropane are slowly added 26.9 parts of sodium p-chlorophenoxide dissolved in about 64 parts of absolute ethanol. After the addition is complete, the reaction mixture is refluxed for 6 hours. The product is then isolated and purified, as in previous examples, and amounts to 8.8 parts of p-chlorophenyl 3,3-dichloro-2-propenyl ether, b. 121–122° C./3 mm.; $n_D^{20}$ 1.5624.

Example 2

A mixture of 181.8 parts of 1,1,1,3-tetrachloropropane and 98 parts of anhydrous potassium acetate is heated at reflux and with stirring for 13 hours. The reaction mixture is then filtered and the filtrate is fractionally distilled to yield 22.2 parts of 3,3-dichloro-2-propenyl acetate, b. 116–117° C./103 mm.; $n_D^{20}$ 1.4652.

Example 3

A solution of 45.45 parts of 1,1,1,3-tetrachloropropane and 8.52 parts of ammonia in 35 parts of 95% aqueous ethanol (diluent) is heated at 85° C. in a glass-lined pressure vessel for 16 hours and with agitation. The reaction mixture is then evaporated to remove the solvent and any unreacted ammonia still present. The residue is dissolved in dilute hydrochloric acid and the solution is extracted with several portions of diethyl ether. The aqueous solution is then neutralized with 10% aqueous sodium hydroxide and the amine is extracted from the neutralized solution with diethyl ether. The ether extract is dried and dry gaseous hydrogen chloride is introduced to precipitate the bis(3,3-dichloro-2-propenyl)amine hydrochloride, m. 216–218° C.; per cent nitrogen, 5.31 (theory, 5.16%).

Having thus described our invention, what we claim and desire to protect by Letters Patent is:

1. A method which comprises reacting a tetrahalogenoalkane containing a trihalogenomethyl group in which two of the halogens are chlorine and the third halogen is selected from the group consisting of chlorine and bromine, said trihalogenomethyl group being connected to an additional halogen atom by an aliphatic chain of two carbon atoms, with an alkaline substance selected from the class consisting of compounds of the type MA where M is a cation-forming atom, and A is a radical selected from the class consisting of acidyloxy, alkoxy, alkenylalkoxy, aryloxy, and amino radicals, and separating a compound of the type formula $$X_2C=CR—CR'R''—A$$

where X is chlorine, and R, R' and R'' are selected from the class consisting of hydrogen and a hydrocarbon radical.

2. A method which comprises reacting a tetrahalogenoalkane containing a trihalogenomethyl group in which two of the halogens are chlorine and the third halogen is selected from the group consisting of chlorine and bromine, the said trihalogenomethyl group being connected to an additional halogen atom by an aliphatic chain of two carbon atoms, with an alkaline substance selected from the class consisting of compounds of the type MA where M is a cation-forming atom, and A is acidyloxy, and separating a compound of the type formula $X_2C=CR—CR'R''—A$ where X is chlorine, and R, R' and R'' are selected from the class consisting of hydrogen and a hydrocarbon radical.

3. A method which comprises reacting a tetrahalogenoalkane containing a trihalogenomethyl group in which two of the halogens are chlorine and the third halogen is selected from the group consisting of chlorine and bromine, said trihalogenomethyl group being connected to an additional halogen atom by an aliphatic chain of two carbon atoms, with an alkaline substance selected from the class consisting of compounds of the type MA where M is a cation-forming atom, and A is aryloxy, and separating a compound of the type formula $$X_2C=CR—CR'R''—A$$

where X is chlorine, and R, R' and R'' are selected from the class consisting of hydrogen and a hydrocarbon radical.

4. A method which comprises reacting a tetrahalogenoalkane containing a trihalogenomethyl group in which two of the halogens are chlorine and the third halogen is selected from the group consisting of chlorine and bromine, said trihalogenomethyl group being connected to an additional halogen atom by an aliphatic chain of two carbon atoms, with an alkaline substance selected from the class consisting of compounds of the type MA where M is a cation-forming atom, and A is an amino radical, and separating a compound of the type formula $X_2C=CR—CR'R''—A$ where X is chlorine, and R, R' and R'' are selected from the class consisting of hydrogen and a hydrocarbon radical.

5. A method which comprises reacting 1,1,1,3-tetrachloropropane with sodium p-chlorophenoxide and separating p-chlorophenyl 3,3-dichloro-2-propenyl ether from the reaction mixture.

6. A method which comprises reacting 1,1,1,3-tetrachloropropane with anhydrous potassium acetate and separating 3,3-dichloro-2-propenyl acetate from the reaction mixture.

7. A method which comprises reacting 1,1,1,3-tetrachloropropane with ammonia and separating 3,3-dichloro-2-propenyl amine from the reaction mixture.

ELBERT C. LADD.
MERLIN P. HARVEY.

REFERENCES CITED

The following references are of record in the file of this patent:

UNITED STATES PATENTS

| Number | Name | Date |
| --- | --- | --- |
| 2,336,921 | Benning | Dec. 14, 1943 |
| 2,375,301 | Joyce | May 8, 1945 |
| 2,425,426 | Joyce | Aug. 12, 1947 |
| 2,468,208 | Kharasch | Apr. 26, 1949 |
| 2,477,342 | McBee | July 26, 1949 |
| 2,500,009 | Saunders | Mar. 7, 1950 |